(12) United States Patent
Ceasar

(10) Patent No.: US 12,433,967 B2
(45) Date of Patent: *Oct. 7, 2025

(54) APPARATUS AND A METHOD FOR EJECTING ONE OR MORE SUBSTANCES

(71) Applicant: Marcus Ceasar, Fort Lauderdale, FL (US)

(72) Inventor: Marcus Ceasar, Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/786,744

(22) Filed: Jul. 29, 2024

(65) Prior Publication Data

US 2024/0382638 A1    Nov. 21, 2024

Related U.S. Application Data

(63) Continuation-in-part of application No. 18/540,302, filed on Dec. 14, 2023, now Pat. No. 12,070,761.

(60) Provisional application No. 63/431,813, filed on Dec. 12, 2022.

(51) Int. Cl.
*A61L 9/013*      (2006.01)

(52) U.S. Cl.
CPC .................................... *A61L 9/013* (2013.01)

(58) Field of Classification Search
CPC .............................. B05B 11/043; A61M 11/02
USPC .............................. 222/145.5–145.6, 206–212
See application file for complete search history.

(56) References Cited

U.S. PATENT DOCUMENTS

| | | |
|---|---|---|
| 653,866 A | 7/1900 | Solomon |
| 1,899,698 A | 2/1933 | Klein |
| 2,120,948 A | 6/1938 | Beck |
| 2,571,504 A | 10/1951 | Vuillemenot |
| 2,631,064 A | 3/1953 | Tupper |
| 2,896,840 A | 7/1959 | Hendry |
| 3,572,590 A | 3/1971 | Malone |
| 4,184,615 A | 1/1980 | Wright |
| 4,378,088 A | 3/1983 | Ewing |
| 4,603,794 A | 8/1986 | DeFord |
| 4,771,769 A | 9/1988 | Hegemann |

(Continued)

FOREIGN PATENT DOCUMENTS

| | | |
|---|---|---|
| WO | 0168455 A1 | 9/2001 |
| WO | 03043743 A1 | 5/2003 |

(Continued)

*Primary Examiner* — Paul R Durand
*Assistant Examiner* — Michael J. Melaragno
(74) *Attorney, Agent, or Firm* — Wiggin and Dana LLP

(57) ABSTRACT

An apparatus for ejecting one or more substances is disclosed. The apparatus includes a housing including an upper portion and a lower portion, wherein the lower portion of the housing includes flexible materials. The apparatus includes a cover configured to cover the upper portion of the housing. The apparatus includes one or more reservoirs configured to store one or more substances within the lower portion of the housing. The apparatus includes one or more protruding components configured to mix the one or more substances within the one or more reservoirs, wherein one or more protruding components are located inside the one or more reservoirs. The apparatus includes a flow port configured fluidically connect the one or more reservoirs to the ejector. The apparatus includes the ejector configured to eject the one or more substances from the flow port.

20 Claims, 6 Drawing Sheets

(56) References Cited

U.S. PATENT DOCUMENTS

| | | | |
|---|---|---|---|
| 6,250,568 B1 | 6/2001 | Prueter | |
| 6,378,845 B1 | 4/2002 | Hsu et al. | |
| 6,648,244 B2 | 11/2003 | Yu | |
| 6,808,091 B2* | 10/2004 | Njaastad | B67D 1/0081 |
| | | | 239/431 |
| 6,860,404 B2 | 3/2005 | Duqueroie | |
| 6,955,277 B2* | 10/2005 | Smith | E04F 21/165 |
| | | | 222/145.5 |
| 6,997,353 B2 | 2/2006 | Decottignies et al. | |
| 7,780,041 B2 | 8/2010 | Albisetti | |
| 8,603,557 B2* | 12/2013 | de Cleir | C12G 3/06 |
| | | | 215/310 |
| 11,524,308 B2 | 12/2022 | Whalley et al. | |
| 2002/0153389 A1* | 10/2002 | Creaghan | B05B 11/043 |
| | | | 222/190 |
| 2003/0010795 A1 | 1/2003 | Duqueroie | |
| 2003/0010844 A1 | 1/2003 | Duqueroie | |
| 2003/0075554 A1* | 4/2003 | Duqueroie | B65D 1/32 |
| | | | 222/211 |
| 2005/0207982 A1* | 9/2005 | Jendrucko | A61M 15/00 |
| | | | 424/725 |
| 2007/0045448 A1 | 3/2007 | Albisetti | |
| 2012/0114800 A1 | 5/2012 | McKay | |
| 2012/0211526 A1 | 8/2012 | Dupuis | |
| 2013/0075430 A1 | 3/2013 | Ragnarsson et al. | |
| 2016/0282381 A1 | 9/2016 | Ferrara, Jr. | |
| 2017/0056904 A1* | 3/2017 | Brugger | B65D 81/3244 |
| 2022/0072572 A1* | 3/2022 | Whalley | B05B 11/1011 |

FOREIGN PATENT DOCUMENTS

| | | |
|---|---|---|
| WO | 2010105775 A2 | 9/2010 |
| WO | 2018234525 A1 | 12/2018 |

* cited by examiner

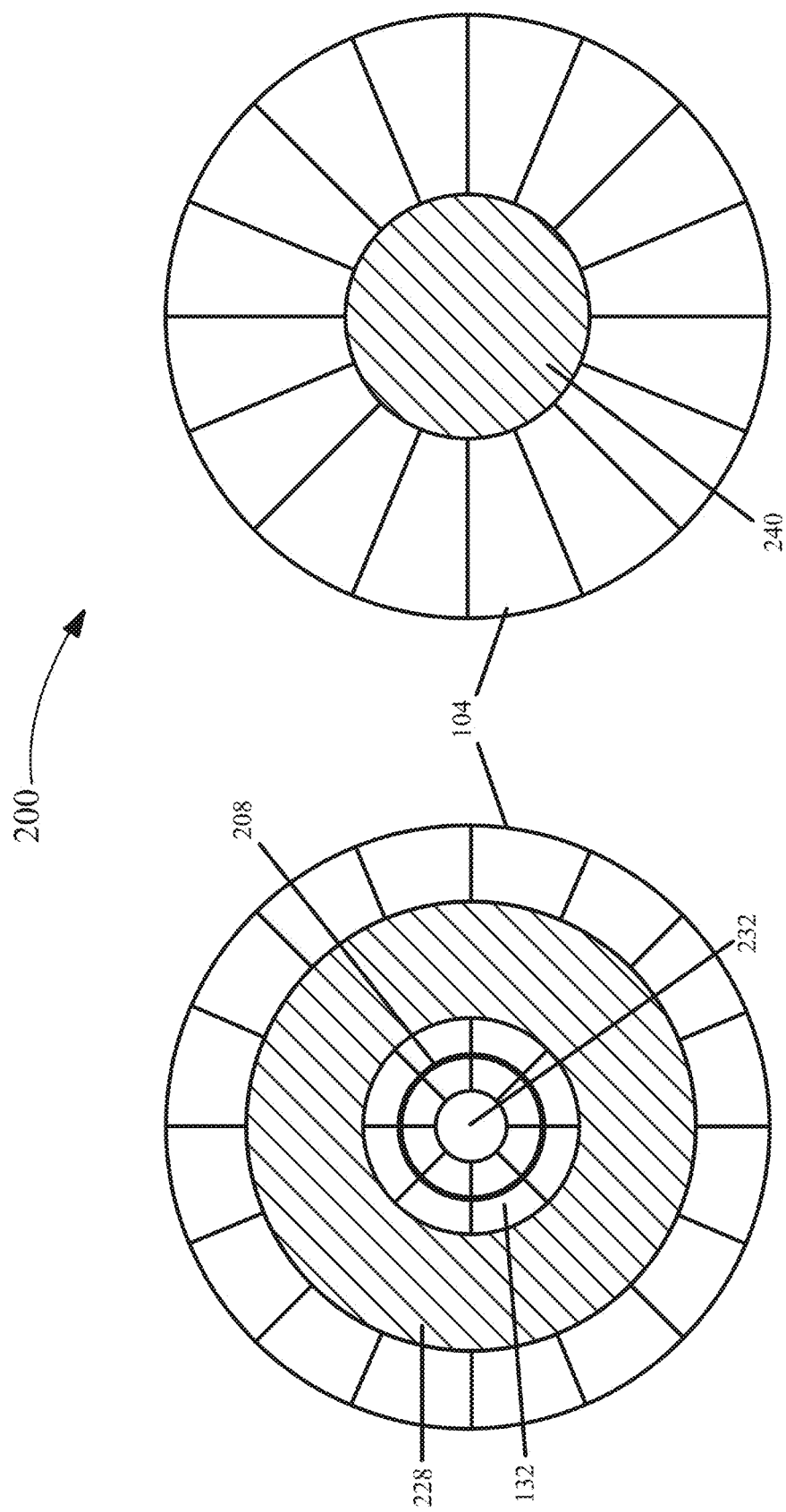

APPARATUS AND A METHOD FOR EJECTING ONE OR MORE SUBSTANCES

CROSS-REFERENCE TO RELATED APPLICATIONS

This application is a continuation-in-part of U.S. Nonprovisional patent application Ser. No. 18/540,302, filed on Dec. 14, 2023, and titled "APPARATUS AND A METHOD FOR EJECTING ONE OR MORE SUBSTANCES," which claims the benefit of priority of U.S. Provisional Patent Application Ser. No. 63/431,813, filed on Dec. 12, 2022, and titled "APPARATUS AND METHOD FOR LIQUID VAPORIZING," both of which are incorporated by reference herein in their entirety.

FIELD OF THE INVENTION

The present invention generally relates to the field of liquid vaporizers. In particular, the present invention is directed to an apparatus and a method for ejecting one or more substances.

BACKGROUND

Common aerosol cans typically include volatile organic compounds (VOCs), which are gases released into the atmosphere from various products or processes. Certain VOCs pose individual health risks, with some identified as carcinogens. Moreover, certain VOCs can undergo reactions with other gases, giving rise to additional air pollutants. To address these concerns, alternative solutions are imperative, ones that do not depend on the use of VOCs.

SUMMARY OF THE DISCLOSURE

In an aspect, an apparatus for the ejecting one or more substances is disclosed. The apparatus includes a housing comprising an upper portion and a lower portion, wherein the lower portion of the housing is comprised of flexible materials. The apparatus includes a cover configured to cover the upper portion of the housing. The apparatus includes one or more reservoirs configured to store one or more substances within the lower portion of the housing. The apparatus includes one or more protruding components configured to mix the one or more substances within the one or more reservoirs, wherein the one or more protruding components are located inside the one or more reservoirs. The apparatus includes a flow port configured fluidically connect the one or more reservoirs to the ejector. The apparatus includes the ejector configured to eject the one or more substances from the flow port, wherein the ejector is located on the upper portion of the housing.

In another aspect, a method for the ejecting one or more substances is disclosed. The method includes obtaining a housing comprising an upper portion and a lower portion, wherein the lower portion of the housing is comprised of flexible materials. The method includes covering, using a cover, the upper portion of the housing. The method includes one or more reservoirs configured to store one or more substances within the lower portion of the housing. The method includes one or more protruding components configured to mix the one or more substances within the one or more reservoirs, wherein the one or more protruding components are located inside the one or more reservoirs. The method includes a flow port configured fluidically connect the one or more reservoirs to the ejector. The method includes the ejector configured to eject the one or more substances from the flow port, wherein the ejector is located on the upper portion of the housing.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIGS. 2A-E is an exemplary embodiment of an apparatus for ejecting one or more substances;

Figure 1B:
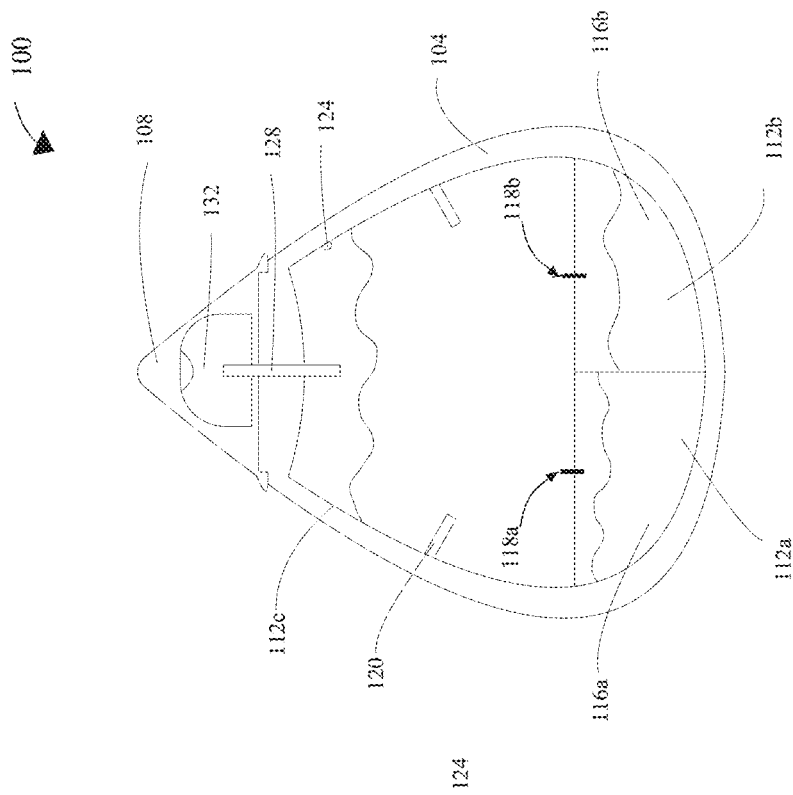
FIGS. 1A-B is an exemplary embodiment of an apparatus for ejecting one or more substances.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to an apparatus and a method for ejecting one or more substances is disclosed. The apparatus includes a housing comprising an upper portion and a lower portion, wherein the lower portion of the housing is comprised of flexible materials. The apparatus includes a cover configured to cover the upper portion of the housing. The apparatus includes one or more reservoirs configured to store one or more substances within the lower portion of the housing. The apparatus includes one or more protruding components configured to mix the one or more substances within the one or more reservoirs, wherein the one or more protruding components are located inside the one or more reservoirs. The apparatus includes a flow port configured fluidically connect the one or more reservoirs to the ejector. The apparatus includes the ejector configured to eject the one or more substances from the flow port, wherein the ejector is located on the upper portion of the housing. Exemplary embodiments illustrating aspects of the present disclosure are described below in the context of several specific examples.

Referring now to FIG. 1, an exemplary embodiment of an apparatus 100 for ejecting one or more substances is illustrated. Apparatus 100 includes a housing 104. As used in this disclosure, a "housing" is a casing that encloses and protects internal elements of an apparatus. The housing 104 may be an enclosure that accommodates the essential components of the device while providing aesthetic appeal and functionality. The housing 104 may be a sleek and compact unit crafted from durable, lightweight materials. Its exterior may be made of smooth plastic, allowing for easy cleaning and maintenance. As a non-limiting example, housing 104 may be a casing for apparatus 100. In some embodiments, housing 104 may be made of multiple materials including wood, plastics, metals, glass, and the like. The housing 104 may be made wholly or partially of recyclable materials. As used in this disclosure, "recyclable material" is any type of material that can be recycled. As a non-limiting example, housing may include glass, steel, aluminum, polyethylene terephthalate (PET), polypropylene (PP), high density polyethelene (HDPE), polylactic acid (PLA), wood fiber, bamboo, palm leaf, or the like. In some embodiments, housing 104 may be partially rigid. In other embodiments, housing 104 may be wholly or partially made of compressible or malleable materials. As used in this disclosure, "flexible materials" refers to any materials that can be flexed with a force applied by a user. The housing 104 may be configured to be in one or more positions as a function of being flexed. The act of actively compressing the flexible materials of the housing 104 may be referred as transitioning the housing from a decompressed state to a compressed state. Actively compressing the flexible materials of the housing 104 may include reducing the internal volume of one or more of the plurality of reservoirs 112, In an embodiment, when the housing is in a compressed state the first reservoir 112a and the second reservoir 112b may each have a reduced internal volume. As used in the current disclosure, a "compressed state" refers to a state where the housing and its components are pressed or squeezed together. As used in the current disclosure, a "decompressed state" refers to a state where the housing and its components are not being pressed and squeezed together. As a non-limiting example, the user may apply a force to the flexible material using the user's hand to place the housing 104 in a compressed state. In some embodiments, only a portion of housing 104 may be flexible. As a non-limiting example, the lower portion of the housing 104 may be compressible while upper portion of housing 104 is rigid. The lower portion of the housing 104 may include the entire housing below the cover 108. The upper portion of the housing 104 may include the tiered portion of the housing that is covered using the cover 108. In some embodiments, housing 104 may include a grip texture. As used in this disclosure, "grip texture" is a textured material that can make gripping an object easier. As a non-limiting example, the grip texture may include a plastic with a high friction coefficient. In some embodiments, the grip texture may cover entire housing 104. In another embodiment, the grip texture may cover a portion of housing 104. As a non-limiting example, the grip texture may cover only a portion of housing that is compressible. As another non-limiting example, the grip texture may cover only a portion of housing that is rigid. In an embodiment, the housing 104 may incorporate a transparent or translucent section, providing a visual indicator of the remaining substance. This may allow the user to monitor the level and plan for refills accordingly. Some designs may include LED lights or color-coding to enhance the visual feedback.

Figure 1A:
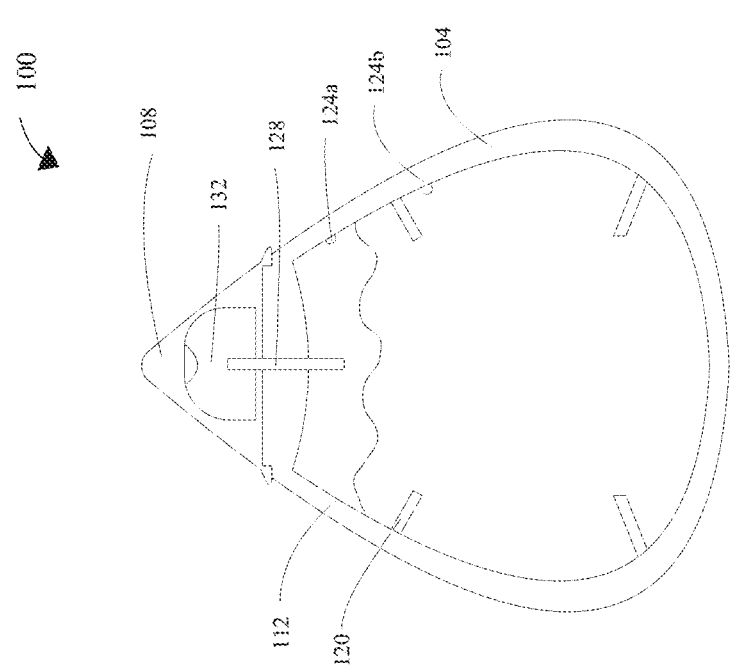

With continued reference to FIG. 1A-1B, essential oil may include but is not limited to Lavandula angustifolia oil, Odorata flower oil, Hamamelis virginiana leaf extract, Myroxylon pereirae oil, and/or Aurantium bergamia fruit oil. In an embodiment, essential oil may include a mixture of one or more essential oils. For instance and without limitation, essential oil may include a mixture comprising Hamamelis virginiana leaf extract, Lavandula angustifolia oil, Myroxylon pereirae oil, Citrus aurantium bergamia fruit oil, and Cananga Odorata flower oil. Lavandula angustifolia oil, also known as lavender oil, includes an essential oil derived from the flowers of the Lavandula angustifolia plant. Health benefits of Lavandula angustifolia oil may include but are not limited to relaxation, stress reduction, improved sleep quality, skincare, hair growth, scalp health, pain relief, insect repellent, and the like. In an embodiment, Lavandula angustifolia oil may be present at a concentration ranging anywhere from 0-100%. Odorata flower oil, also known as Ylang Ylang includes an essential oil derived from Tuberose and/or Jasmine flowers, including tuberose oil and/or jasmine oil. Health benefits may include but are not limited to perfumery, cosmetics, and/or aromatherapy. In an embodiment, Odorata flower oil may be present at a concentration ranging anywhere from 0-100%. Hamamelis virginiana leaf extract, also known as witch hazel, includes an essential oil derived from the leaves of the witch hazel plant. Health benefits may include, but are not limited to astringent properties, anti-inflammatory effects, antioxidant benefits, skin conditioning, wound healing, and/or anti-itch and cooling effects. Hamamelis virginiana leaf extract may be present at a concentration ranging anywhere from 0-100%. Myroxylon pereirae oil, also known as Balsam of Peru oil, includes an essential oil derived from the resin of the Myroxylon balsamum var. pereirae tree. Health benefits may include but are not limited to aromatic properties, antiseptic, wound healing, antibacterial, antifungal, healing properties, burns, flavoring agent, and the like. Myroxylon pereirae oil may be present at a concentration ranging anywhere from 0-100%. Citrus aurantium bergamia fruit oil, also known as bergamot oil, is an essential oil extracted from the peel of the bergamot orange (Citrus aurantium subsp. bergamia). Health benefits may include but are not limited to antiseptic and soothing properties, haircare, aromatherapy, flavoring, muscle tension, relaxation, and other therapeutic properties. Citrus aurantium bergamia fruit oil may be present at a concentration ranging anywhere from 0-100%. Cananga Odorata flower oil also known as ylang ylang oil, is an essential oil derived from the flowers of the Cananga odorata tree. Health benefits may include aromatic properties, anti-inflammatory effects, antiseptic effects, haircare, aromatherapy, high blood pressure, headaches, intestinal imbalances and the like. In an embodiment, second substance may include an essential oil, including any essential oil and/or combination thereof described herein. In an embodiment, second substance may include water. In an embodiment, water may include one or more preservatives including but not limited to terpenes, terpenoids, carotenoids, coumarins, curcumins, phenolic compounds, alcohols, aldehydes, phenylpropanoids, and/or ketones. In an embodiment, essential oil and second substance may be premixed. Premixed, as used in this disclosure, includes any mixing done before essential oil and second substance are placed within apparatus 100 and/or reservoir. First reservoir may be prefilled. Prefilled, as used in this disclosure, includes any essential oil that is filled and loaded within first reservoir before it has been used and/or distributed. One or more reservoirs contained within apparatus 100 may be refillable. "Refillable" as used in this disclosure includes the ability for any reservoir to be filled again. One or more reservoirs may not be single-use and various substances may be contained within one or more reservoirs. For example, first reservoir may contain lavender oil, whereby after lavender oil is empty, first reservoir may be refilled with Cananga Odorata flower oil. This may allow for apparatus 100 to be reused and to allow for multiple essential oils to be combined and/or utilized as desired. This may be performed utilizing any manufacturing process as described below.

With continued reference to FIG. 1A-1B, in some embodiments, housing 104 may include a cover 108. As used in this disclosure, a "cover" is an object that lies on, over, or around another object in order to protect or conceal it. The cover 108 may be configured to be removably attached to the housing 104. As used in the current disclosure, "removably attached" refers to a method of connecting or fastening two or more objects together in a way that allows them to selectively separate or detach without causing damage or permanent alterations to the objects involved. The removably attached components can be taken apart and reassembled as needed, providing flexibility and convenience for various applications. The cover 108 may be configured to cover an upper portion of the housing 104. This may include covering the ejector 132, flow port 128, or other portions of the tiered area on top of the housing. This is discussed in greater detail herein below. In some embodiments, cover 108 may include a tab configured to assist removing the cover 108 from the housing 104. In some embodiments, cover 108 may be made of the same or similar material as the housing 104. The cover 108 may be configured to mate with the lower portion or upper portion of the housing in various ways. This may include screwing, clips, snap-fit connections, reusable adhesives, magnetic connection, a hinged mechanism, threaded fasteners, interlocking tabs, snap rings, mating connections, and the like. As used in the current disclosure, a "snap-fit connection" is a mechanical fastening method commonly used in manufacturing to join two components together. It may involve designing interlocking features on the housing 104 and the cover 108, allowing them to snap or click into place during assembly. A snap-fit connection may be facilitated using protrusions or recesses designed into the mating parts. One part typically has a protrusion (snap) that engages with a corresponding recess (fit) on the other part. A snap fit connection may include a cantilever snap fit, annular snap fit, torsional snap fit, c-snap fit, and the like. As used in the current disclosure, a "magnetic connection" is a connection that uses magnets to join two components together. Magnetic connections offer advantages such as case of use, quick assembly and disassembly, and a lack of physical contact between the components. In an embodiment, an upper portion of the housing 104 along with the cover 108 may be outfitted with positive and negative magnets respectively. This may include the use of permanent magnets or electromagnets. Permanent magnets have a constant magnetic field, while electromagnets produce a magnetic field when an electric current is applied. In some cases, a magnetic connection may include the use of a magnetic latch. In this type of connection, magnets are used as latches to keep components securely connected. Applying force is required to overcome the magnetic attraction and separate the components. In other embodiments, a magnetic connection may be facilitated using a magnetic snap fit. This may be similar to a magnetic latch, but with additional features like grooves or recesses that guide the components into the correct alignment before the magnetic force takes over to secure the connection.

With continued reference to FIG. 1A-1B, housing 104 and the cover 108 combined may be configured to have a three dimensional teardrop geometry. As used in this disclosure, a "teardrop geometry" is a three dimensional shape that looks like a drop of liquid, where a lower portion is larger than an upper portion with a globular form at the bottom and tapering to a point at the top. A teardrop geometry may include a shape that resembles a tear or a droplet. The teardrop shape is characterized by a rounded or pointed apex that tapers down to a broader, rounded base. At the top of the teardrop, there may be a pointed or rounded apex. This is the narrowest part of the shape. The apex may have a smooth curvature. From the apex, the shape gradually widens or tapers down towards the base. This tapering body gives the teardrop its distinctive form. The tapering can be symmetric or asymmetric, depending on the specific design. The tear drop shape may include in a rounded or slightly flattened base. The base is the widest part of the tear drop and provides stability to the shape. It contrasts with the pointed apex, creating a visually balanced and aesthetically pleasing form. The entire teardrop geometry may be characterized by smooth, continuous curves. The smooth transitions between the apex, tapering body, and rounded base give the tear drop a natural and harmonious appearance. In an embodiment, the base of the teardrop may be flat. This may be done to allow the apparatus to stand upright. Alternatively, the base of the teardrop may be rounded. In some cases, the housing 104 may include a partial teardrop geometry. Wherein the lower portion of the housing 104 includes the partial teardrop geometry while the upper portion of the housing 104 includes a tiered lay out culminating in a nozzle. The tiered layout may include multiple flat area followed by elevated areas. The tiered area may be configured to be wholly or partially covered by the cover 108. Housing 104 may include various other three dimensional shapes and geometries. As a non-limiting example, housing 104 may include a spherical geometry, a rectangular prism geometry, a cubical geometry, a conical geometry, a pyramid-like geometry, a cylindrical geometry, an ellipsoid geometry, a three-dimensional star-like geometry, a three-dimensional heart-like geometry, an egg-like geometry, and the like.

With continued reference to FIG. 1A-1B, housing 104 may include a reservoir 112. As used in this disclosure, a "reservoir" is a place where a substance is held. The reservoir 112 may be a segregated container designed to hold one or more substances. In an embodiment, the reservoir 112 may be configured to isolate each substance of the plurality of substances that are contained within the reservoir 112. In some embodiments, reservoirs 112 may be located at various locations within the housing 104. The reservoir 112 may be located on the bottom of housing 104. In an embodiment, the housing 104 may enclose multiple reservoirs. As a non-limiting example, housing 104 may include a first reservoir 112a, second reservoir 112b, third reservoir 112c, nth reservoir, and the like. A user and or manufacturer may fill the reservoirs 112 with various substances 116. In a non-limiting example, the third reservoir 112c may be empty while the first reservoir 112a and the second reservoir 112b are filled with two separate substances 116. While the housing 104 is in an uncompressed state, each reservoir 112 of the plurality of reservoirs may be completely segregated from one another. "Completely segregated" means there is no fluidic connection between each reservoir. The reservoirs 112 may be completely segregated while the housing is in an uncompressed state. Alternatively, while the housing is in a compressed state, there may be a fluidic connection between the first reservoir 112a and the third reservoir 112c and the second reservoir 112b and the third reservoir 112c. In an embodiment, while the housing 104 is in a compressed state there may not be a fluidic connection between the first reservoir 112a and the second reservoir 112b.

With continued reference to FIG. 1A-1B, some reservoirs 112 may be configured to contain a substance 116. As used in this disclosure, a "substance" is a particular kind of matter with uniform properties. In an embodiment, the substance 116 may include liquid. As used in this disclosure, "liquid" is any fluid that flows freely and conforms to the shape of its container but retains a constant volume independent of pressure. As a non-limiting example, the container may be reservoir 112. As a non-limiting example, a liquid substance 116 may include water, oil, alcohol, perfumes, cleaning solutions, ethanol, and the like. As a non-limiting example, the oil may include an essential oil. As used in this disclosure, "essential oil" is a concentrated hydrophobic liquid containing volatile chemical compounds from plants. Essential oils may capture the natural fragrance and essence of the plant from which they are derived. Essential oils may be used in aromatherapy, perfumes, and various other applications due to their distinctive scents and potential therapeutic properties. In some embodiments, the essential oil may include the characteristic fragrance of the plant or other source from which it is extracted. Examples of essential oils may include lavender, peppermint, eucalyptus, tea tree, lemon, chamomile, rosemary, and the like. In an embodiment, each reservoir of the plurality of reservoirs 112 may contain one type of liquid substance 116. As a non-limiting example, a first reservoir 112a may contain water while a second reservoir 112b may contain an essential oil.

With continued reference to FIG. 1A-1B, a substance 116 may be scented. As used in this disclosure, "scent" is a distinctive smell. As a non-limiting example, the scent associated with the substance 116 may include a floral scent, woody scent, fruity scent, fresh scent, and the like. As a non-limiting example, floral scent may include eucalyptus scent, jasmine scent, lavender smell, rosemary smell, and the like. As a non-limiting example, woody scent may include sandalwood scent, pine scent, cedarwood scent, and the like. As a non-limiting example, a fruity scent may include lemon scent, mango scent, mango scent, passion fruit scent, strawberry scent, and the like. As a non-limiting example, apparatus may include jasmine scent, strawberry scent, and/or mango scent. In some embodiments, a user may create one's own scent. As a non-limiting example, the user may create a new scent my mixing the jasmine scent and the pine scent. In some embodiments, substance 116 may include a dye. As used in this disclosure, a "dye" is a natural or synthetic substance used to add a color to or change the color of a substance. In some embodiments, the dye may change the color of substance 116 to black, yellow, pink, red, orange, green, blue, or any other color thereof.

With continued reference to FIG. 1A-1B, the first substance 116a within the first reservoir 112a and second substance 116b within the second reservoir 112b may be mixed in the third reservoir 112c. In some embodiments, each reservoir 112 may be equipped with one-way valves. Wherein the one-way valves may be configured to be in the open position when housing 104 is a compressed state. The compression of the housing 104 may create positive pressure between the first and second reservoir 112a/112b and the third reservoir 112c. This positive pressure facilitates the flow of the first substance 112a and the second substance 112b into the third reservoir 112c. As a non-limiting example, a first reservoir 112a that includes a first substance 116a and a second reservoir 112b that includes a second substance 116b. When the housing is compressed the one-way valves may facilitate the release of the first substances 116a and the second substances 116b in to a third reservoir 112c. Alternatively, when the housing 104 is in a compressed state the third reservoir 112c may be used a mixing chamber for both the first substance 116a and the second substance 116b. In some cases, the first reservoir 112a and the second reservoir 112b may be configured to release the substances 116 in to the housing 104 as a function of the housing being shaken as opposed to being compressed. In an embodiment, each reservoir of the plurality of reservoirs 112 may be configured to be of a similar size and shape. In other embodiments, the plurality of reservoirs 112 may be configured to be of different sizes and shapes. As a non-limiting example, the first reservoir 112a and the second reservoir 112b may be configured to be smaller in volume as compared to the third reservoir 112c. The first and the second reservoirs may be configured to have symmetrical geometries in relation to each other as displayed in FIG. 1B. The third reservoir 112c may be located above the first reservoir 112a and the second reservoir 112b.

With continued reference to FIG. 1A-1B, each reservoir of the plurality of reservoirs 112 may be equipped with one or more one-way valves 118. A one-way valve 118, also known as a check valve or non-return valve, is a mechanical device that allows fluid (liquid or gas) to flow in only one direction. It prevents backflow or reverse flow of the fluid, ensuring that it moves in the desired direction. The valve has two openings known as the inlet and outlet ports. Fluid enters through the inlet and exits through the outlet. The configuration may vary, but these ports are usually labeled or designed in a way that indicates the intended flow direction. Inside the valve, there may be a movable element that obstructs or allows the flow of fluid. This element can take the form of a flap, disc, or ball, and its movement is pivotal in regulating the flow direction. The movable element may be attached to a hinge or pivot point within the valve. This allows the element to move freely in response to the pressure exerted by the fluid or by compression by the user. The hinged or swinging mechanism enables the element to block the flow in the reverse direction. In an embodiment, a first reservoir 112a may be equipped with a first one-way valve 118a, whereas a second reservoir 112b may be equipped with a second one-way valve 118b. In an embodiment, both of the first one-way valve 118a and the second one-way valve 118b may be fluidly connected to the third reservoir 112c.

With continued reference to FIG. 1A-1B, a reservoir 112 may include one or more protruding components 120. As used in the current disclosure, a "protruding component" is an object protruding from an interior surface of a reservoir. In some embodiments, protruding components 120 may project from an interior surface of reservoir 112. The protruding component 120 may be a stationary agitator within a reservoir 112. The protruding component 120 may include a mechanical device designed to stir or mix the substances 116 within the reservoir 112. The purpose of the protruding component 120 may be to promote homogeneity, prevent settling of solids, and enhance the overall efficiency of processes within the reservoir 112. The protruding component 120 may be in a fixed position within the reservoir 112, typically attached to the reservoir walls or mounted on a support structure. The protruding component 120 may extend into the reservoir 112 to facilitate mixing. The design of these protruding components 120 can include flat blades, pitched blades, or other configurations depending on the specific application requirements. In an embodiment, the each reservoir of the plurality of reservoirs 112 may contain one or more protruding components 120. A protruding component 120 may be positioned in an angled manner with reference to a vertical plane. As a non-limiting example, protruding component 120 may be angled 15°, 30°, 45°, 60°, 75°, 90°, 105°, 120°, 135°, 160°, 175°, 180°, up to 360°. The angle of the protruding component 120 may be measured from a vertical plane in a clockwise direction. In some embodiments, each of the plurality of protruding components 120 may be configured to have a different angle. As a non-limiting example, a first protruding component 120 may be angled 30° while a second protruding component 120 may be angled 60°. In some embodiments, protruding component 120 may be configured to have a rectangular prism geometry, a cubical geometry, a conical geometry, a disk like geometry, a semi-circular geometry, and the like. As another non-limiting example, the first reservoir 112a and the second reservoir 112b may not include protruding component 120 while a third reservoir 112c includes protruding component 120. Each reservoir 112 may include multiple protruding components 120. In an embodiment, the multiple protruding components 120 may be configured to be evenly and symmetrically spaced thorough out the reservoir 112.

With continued reference to FIG. 1A-1B, a protruding component 120 may improve the mixing process for the plurality of substances 116. By adding protruding component 120 to reservoir 112, it may increase surface area of reservoir 112 which may improve the mixture of substances 116. In some embodiments, protruding component 120 may be configured to move to improve the mixture of a plurality of substances 116. The protruding component 120 may be configured to move in flapping motion when the housing is in a compressed state. The positive pressure from the compression may facilitate movement of the protruding components. Alternatively, movement of the protruding components 120 may occur as a result of apparatus 100 being shaken. As used in this disclosure, "flapping motion" refers to the movement of the protruding components 120 side to side. The protruding component 120 may be made of a malleable material which allows the upper portion of the protruding component 120 to sway back and forth. Examples of malleable materials may include plastics, rubber, and the like. In some embodiments, protruding component 120 may be made of the same or a similar material as the housing 104, this may include recyclable materials.

With continued reference to FIG. 1A-1B, reservoir 112 may include an indicator 124. As used in this disclosure, an "indicator" is a mechanical component that indicates the amount of a substance 116 within a reservoir 112. In some embodiments, indicator 124 may be configured to indicate a preferred fill level for substance 116. As used in this disclosure, a "preferred fill level" refers to a level of a substance to be filled in a reservoir that is set as a suggestion. As a non-limiting example, the indicator 124 may include markings to indicate a preferred fill level for a substance 116 inside of reservoir 112. In some embodiments, indicator 124 may be configured to indicate a maximum fill level for substance 116. As used in this disclosure, a "maximum fill level" refers to a maximum level that is set as an upper limitation of the contents of the reservoir 112. In another embodiment, indicator 124 may be transparent window into one or more of the reservoirs 112. This window may be configured to include line marks that represent each fill level. In an embodiment, indicator 124 may be etched into the side of the housing 104. Alternatively, indicator 124 may be painted on to the housing 104. In another embodiment, indicator 124 may be a protrude from the exterior of the housing 104. As a non-limiting example, reservoir 112 may include a first indicator 124 on the first side and a second indicator on a second side. As a non-limiting example, a first indicator 124a may indicate the volume of the first substance 116a within the first reservoir 112a. While a second indicator 124b may indicate the volume of a second substance 116b within a second reservoir 112b. In an embodiment, one indicator 124 may be used to identify the volume of one or more substances within a single reservoir 112. In a non-limiting example, an indicator 124 may identify the volume of both water and essential oils within a single reservoir 112. In an additional embodiment, the housing may include a plurality of indicators 124. Each of these indicators 124 may be used to identify the volume one or more substances within a single reservoir 112. In a non-limiting example, a first indicator 124a may indicate the volume of water in a single reservoir 112 and while the second indicator 124b may indicate the volume of essential oils in the same reservoir 112. A user may fill the reservoir up to the first indicator and then continue to fill the reservoir to the second reservoir 112.

With continued reference to FIG. 1A-1B, in some embodiments, apparatus 100 may include flow port 128. In some embodiments, flow port 128 may be fluidically connected to a reservoir 112. As used in this disclosure, "flow port" is a port that allows a flow of a substance. In some embodiments, flow port 128 may include a tube-like structure that may allow a bidirectional flow of a substance 116 to and from reservoir 112. As a non-limiting example, flow port 128 may include a plastic tube extends from an interior portion of the housing 104 and/or reservoir 112 to the ejector 132. The flow port 128 may be used to deliver the mixed substances 116 from the third reservoir 112c to the ejector 132. The positive pressure from compression of the housing 104 may be used to facilitate the transport of the mixed substance 116.

With continued reference to FIG. 1A-1B, apparatus 100 may include an ejector 132. As used in this disclosure, "ejector" is a device that ejects substances into the air. An ejector 132 may eject a mixture of water and essential oil in a mist like fashion. In some embodiments, ejector 132 may include a nozzle, mesh, and/or other form of aerosol forming component. An ejector 132 may be removably attached to the upper portion of the housing 104. This attachment may be facilitated using a threaded attachment which will allow a user to screw the ejector 132 on to the housing 104. In an embodiment, an upper portion of the ejector may be configured to screw on to the top of the housing 104. The upper portion of the ejector 132 may be configured to create the tiered portion of the housing 104, discussed herein above. Additionally the upper portion of the ejector 132 may be configured to be covered by the cover 108. In some embodiments, ejector 132 may be configured to output a spray or mist composed of two or more substances 116. The housing 104 may be compressed to facilitate the ejection of the substances 116 from the ejector 132. This may be done by creating a vacuum using the passage of air between the flow port 128 and the third reservoir 112c. When the airflow stops, a small amount of substances 116 may remain in the flow port 128 and, because of the cohesion properties of liquids, may act as another mechanism to pull substances 116 up the flow port 128 to the ejector 132 once the housing 104 is depressed again. As another non-limiting example, the vacuum created by the passage of air may pull substances 116 up into flow port 128 and pushes it out through the nozzle when housing 104 is squeezed. In some embodiments, substances 116 may get atomized while it gets sprayed. As used in this disclosure, "atomizing" refers to breaking a large body up into small, discrete bodies. As a non-limiting example, when the air flow pulls some of substances 116 out of reservoir 112 using flow port 128 through ejector 132 and mixes it with the air flow, the substances 116 may break up into drops suspended in the air, each of which may include the same ratio of oils, alcohols, water and dyes, wherein the substances 116 may include a mixture of oils, alcohols, water and dyes. In some embodiments, ejector 132 may include a venturi. As used in this disclosure, a "venturi" is a restriction surface at the end of an ejector. In some embodiments, when the air and substances 116 pass through ejector 132, it may cause the substances 116 to break up into small drops and mixes it with the air. The venturi may speed up the air and the substances 116, causing the substances 116 to break up and the air to disperse it widely.

Referring now to FIG. 1A-1B, apparatus 100 may be mounted on various surfaces. This may include glass, steel, aluminum, plastic, and the like. As a non-limiting example, apparatus 100 may be mounted on vehicle's heating, ventilation, and air conditioning (hvac) vent. As a non-limiting example, apparatus 100 may be mounted on a car dashboard. In another embodiment, apparatus 100 may be hung on an object. As a non-limiting example, apparatus 100 may be hung in a rear-view mirror of a car. As another non-limiting example, apparatus 100 may be hung in a closet, door knob, keychain, a wall, zipper, and the like.

With continued reference to FIG. 1A-1B, in some embodiments, apparatus 100 may be a disposable product. As used in this disclosure, a "disposable product" is a product designed for a single use after which it is recycled or is disposed as solid waste. As a non-limiting example, a user may dispose apparatus 100 into a recycling bin. In some embodiments, apparatus 100 may be recyclable. In some embodiments, apparatus 100 may be a reusable product. As used in this disclosure, a "reusable product" is a product designed for multiple uses. As a non-limiting example, a user may refill a liquid and reuse apparatus 100 using one or more one-way valves connected to a first reservoir 112*a* or second reservoir 112*b*. The liquid disclosed herein is further described below. In some embodiments, apparatus 100 may be recyclable. As used in this disclosure, "recycling" is a process of converting waste materials into new materials and/or objects.

Referring now to FIG. 2A-2B, an exemplary embodiment of an apparatus 200 for ejecting one or more substances is illustrated. Apparatus 200 may include one or more mating components to facilitate the mating of the cover 108 to the housing 104. In an embodiment, the cover 104 may be outfitted with a first mating component 204, while the upper portion 220 of the housing may be outfitted with a second mating component 208. In some embodiments, first mating component 204 and second mating component 208 may include a snap-fit connection. As used in the current disclosure, a "mating component" refers to one or more parts that join together to form a mating connection. The mating connection facilitated by mating the first mating component 204 and the second mating component 208. This may include any mating connection disclosed herein, including a snap-fit connection, magnetic connection threaded fasteners, interlocking tabs, and the like. A mating component may be male or female depending on the design of the housing 104. In an embodiment, the second mating component 208 may be located on the ejector 132. Whereas, the first mating component 204 may be located on an interior surface of the cover 108.

With continued reference to FIG. 2A-2B, apparatus 200 may include a plurality of protruding components 212. In an embodiment, apparatus 200 may include an upper set of protruding components 212 and a lower set of protruding components 216. As used in the current disclosure, a "set of protruding components" includes two or more protruding components 120 oriented in a similar fashion. A set of protruding components may include four or more protruding components 120. In an embodiment, an upper set of protruding components may be oriented at a first angle, whereas a lower set of protruding components may be oriented at a second angle. The orientation of the sets of protruding components may be relative to the center point of the housing 120. In an embodiment, a set of protruding components may be oriented parallel with the ground as they extend from the interior surface of the housing 104 or reservoir 112. This may mean that a set of protruding components are oriented at a 90 degree or a 180-degree angle relative to a vertical plane. In an additional embodiment, a set of protruding components may be oriented upward or downward in relation to the center point of the housing. In a non-limiting example, a first angle and/or a second angle may include 45 degrees, 90 degrees, 135 degrees, 180 degrees, 215 degrees, 260 degrees, 315 degrees, 360 degrees, as it relates to the center point of the housing 104. In some embodiments, protruding components 212 may protrude orthogonally from interior surface of reservoir 112. In some embodiments, each protruding component 212 may protrude orthogonally from interior surface of reservoir 112.

With continued reference to FIG. 2A-2B, apparatus 200 may include an upper portion of the housing 220 and a lower portion of the housing 224. An upper portion of the housing may refer to the tapered portion of the housing near the ejector 132. This may include the flat area 228 that leads up to the ejector 132. In an embodiment, the flat area 228 of the upper portion of the housing may extend 360 degrees around ejector 132. When looking from an elevated view the flat area 228 may be completely round when the housing 104 has a tear drop geometry. The flat area 228 of apparatus 200 may be the same or substantially similar to the tiered area of apparatus 100. In an embodiment, the lower portion of the housing 224 may include the areas of the housing 104 that are below the flat area 228. This may include areas of the housing 104 that house the reservoirs 112. In an embodiment, the flat area may include one or more holes. In some cases, the hole may be configured to accept the ejector. The hole may be configured to form a mating connection with the ejector. The mating connection between the flat area 228 and the ejector may be water tight and/or air tight. This may include any mating connection described herein. For example, the mating connection may include a screw connection a snap connection. In an embodiment, both the flat area 228 and the ejector may include mating components.

With continued reference to FIG. 2A-2B, apparatus 200 may include a nozzle 232 that is attached to the ejector 132. The nozzle 232 may be a component attached to an ejector 132, designed to control and direct the flow of fluid or gas. The nozzle 232 may include a constricted throat section through which the fluid or gas flows. This constriction accelerates the fluid velocity, creating a low-pressure zone that induces the entrainment of the secondary fluid (e.g., steam or gas) into the primary fluid stream. The internal geometry of the nozzle 232 may be carefully contoured to optimize fluid flow and achieve the desired effects on the substance. The design may include converging and diverging sections to efficiently convert pressure energy into kinetic energy. In some applications, the nozzle 232 may be designed with adjustable features to allow for control over the flow rate, pressure, or efficiency of the ejector system. This adjustability is crucial for adapting the system to different operating conditions. The nozzle 232 may be attached to the ejector and/or the housing using one or more connection mechanisms disclosed herein.

With continued reference to FIG. 2A-2B, housing 104 may include a grip texture 236. As used in this disclosure, "grip texture" is a textured material that can make gripping an object easier. As a non-limiting example, the grip texture 236 may include a plastics or rubber with a high friction coefficient. In some embodiments, the grip texture 236 may cover entire housing 104. In another embodiment, the grip texture 236 may cover a portion of housing 104. As a non-limiting example, the grip texture 236 may cover only a portion of housing that is compressible. As another non-limiting example, the grip texture 236 may cover only a portion of housing that is rigid.

Figures 2A, 2B:
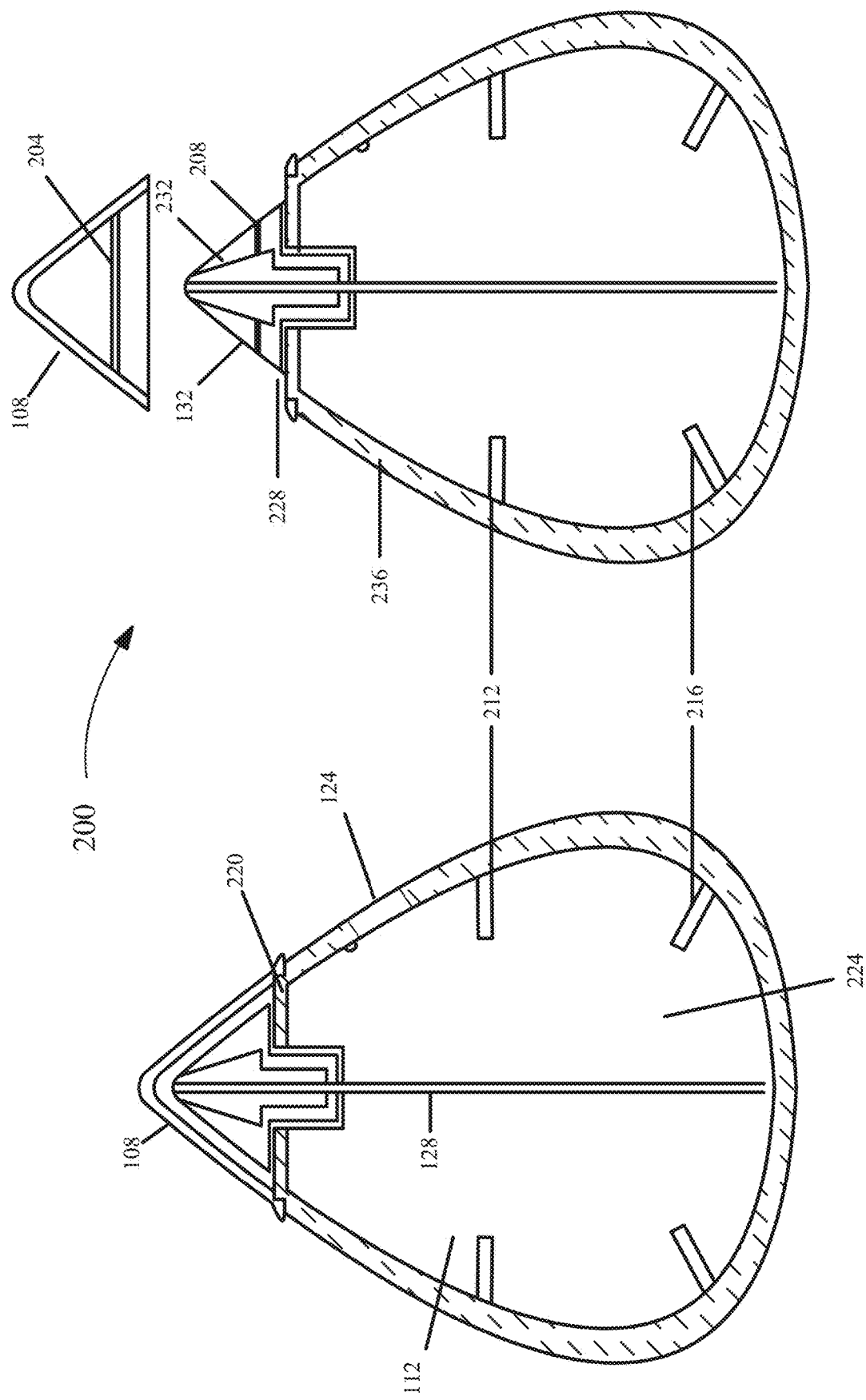

With continued reference to FIG. 2A-2B, each reservoir of the plurality of reservoirs 112 may be equipped with one or more one-way valves. A one-way valve, also known as a check valve or non-return valve, is a mechanical device that allows fluid (liquid or gas) to flow in only one direction. It prevents backflow or reverse flow of the fluid, ensuring that it moves in the desired direction. The valve has two openings known as the inlet and outlet ports. Fluid enters through the inlet and exits through the outlet. The configuration may vary, but these ports are usually labeled or designed in a way that indicates the intended flow direction. Inside the valve, there may be a movable element that obstructs or allows the flow of fluid. This element can take the form of a flap, disc, or ball, and its movement is pivotal in regulating the flow direction.

Referring now to FIG. 2C, an exemplary top view of an apparatus 200 for ejecting one or more substances is illustrated. FIG. 2C depicts an exemplary embodiment of the flat area 228 of the upper portion 220 of the housing 104. The flat area 228 may be positioned near the ejector 132, this flat area 228 may serve as a significant feature in shaping the overall geometry of the housing 104. The flat area 228 may extend 360 degrees around the ejector 132. This may form a circular shape when viewed from an elevated perspective as displayed FIG. 2C.

Referring now to FIG. 2D, an exemplary bottom view of an apparatus 200 for ejecting one or more substances is illustrated. FIG. 2D includes a depiction of an exemplary embodiment of a second flat area 240. As used in the current disclosure, a "second flat area" refers to a region or surface characterized by a lack of curvature or significant elevation changes located on the lower portion of the housing 224. The second flat area 240 may enhance the stability and balance of the entire apparatus 200. By providing a flat and even surface, it ensures that the apparatus sits securely on a given substrate, preventing wobbling or instability during operation. This aspect may be important if the apparatus is designed to house reservoirs 112 that contain liquids or other materials where stability is crucial for accurate and controlled dispensing. In an embodiment, the second flat area may include a plurality of feet. As used in the current disclosure, a "foot" refers to a structure or part of a device that protrudes from the bottom of the housing 104. The plurality of feet may be configured to enhance the stability of the housing 104, Each foot of the plurality of feet may include one or more rubber pads. The rubber pads may be configured to be slip resistant. The plurality of feed may be made of plastic, rubber, metal, or any other materials disclosed herein.

Figure 2E:
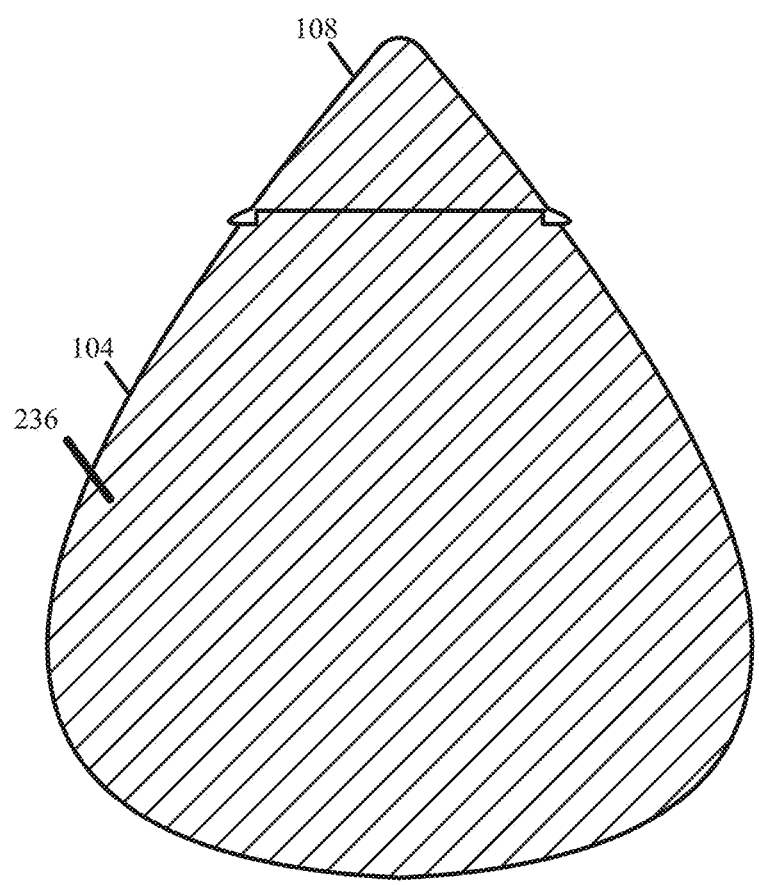

Referring now to FIG. 2E, an exemplary embodiment of an apparatus 200 for ejecting one or more substances is illustrated. FIG. 2E depicts an exemplary embodiment of a housing 104 and cover 108. The housing 104 and the cover 108 may be mated using a mating connection as described herein above. The housing 104 and cover 108, when mated, may feature a distinctive three-dimensional teardrop geometry. The housing 104 may embody a teardrop shape with a rounded and tapered front that gradually extends to the back. The cover 108 may complement the housing, seamlessly integrating with the teardrop profile. The contours of the cover 108 may mirror the housing's form, creating a cohesive and visually appealing unit. The three-dimensional teardrop geometry not only enhances the overall aesthetics of the assembly but also provides structural benefits.

Figure 3:
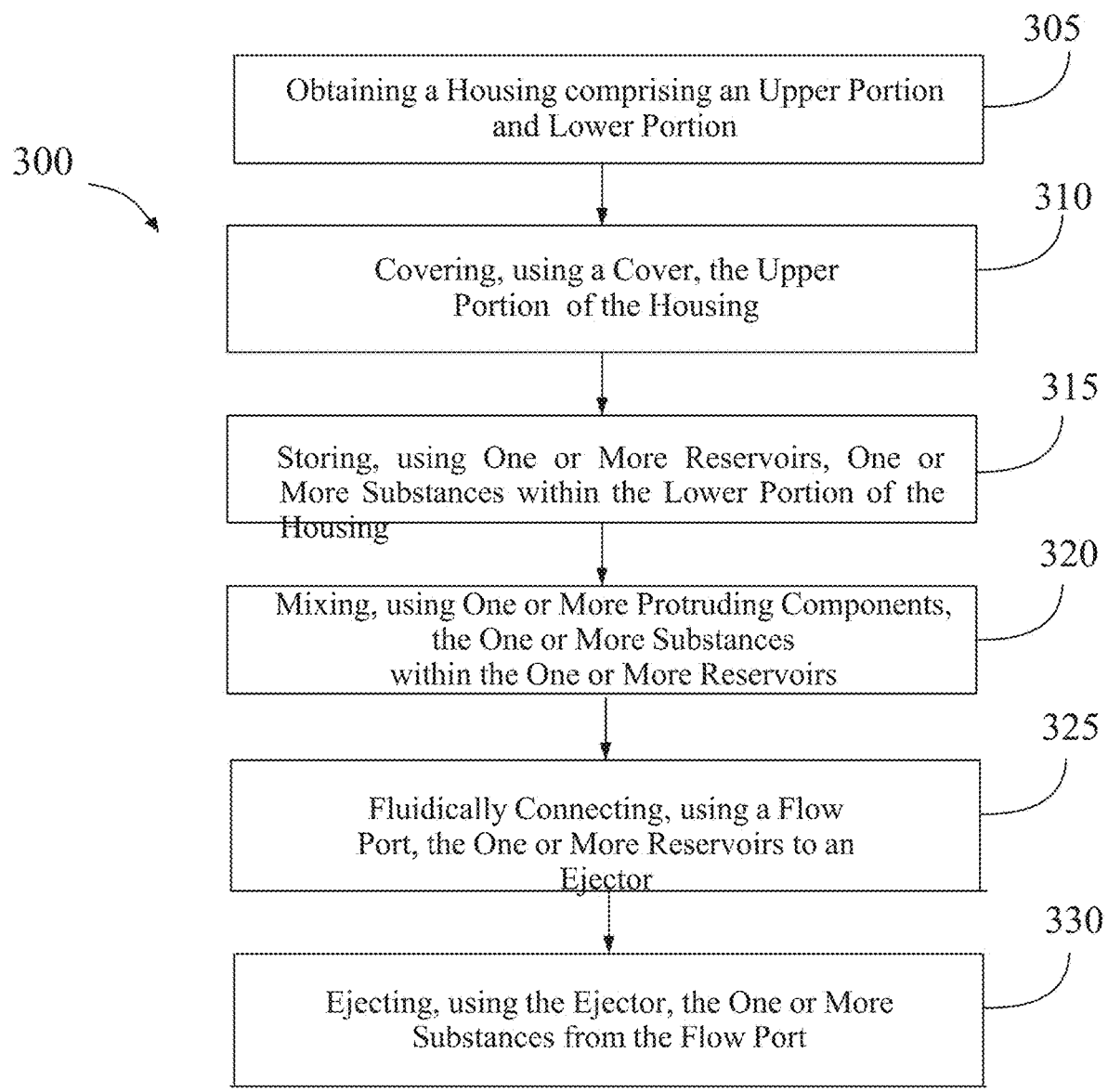
FIG. 3 is a flow diagram of an exemplary method for ejecting one or more substances.

Referring now to FIG. 3, a flow diagram of an exemplary method 300 for ejecting one or more substances is illustrated. At step 305, method 300 includes obtaining a housing comprising an upper portion and a lower portion, wherein the lower portion of the housing is comprised of flexible materials. This may be implemented as described and with reference to FIGS. 1-3. In an embodiment, the flexible materials of the lower portion of the housing may be configured to be in one or more positions as function of a compression status, wherein the one or more positions comprises either a compressed state or a decompressed state.

Still referring to FIG. 3, at step 310, method 300 includes covering, using a cover, the upper portion of the housing, wherein the cover is configured to mate with the lower portion of the housing. This may be implemented as described and with reference to FIGS. 1-3. In an embodiment, a mated housing and cover may be combined to have a teardrop geometry. In some cases, the cover may be configured to mate with the upper portion of the housing using a snap-fit connection or a magnetic connection.

Still referring to FIG. 3, at step 315, method 300 includes storing, using one or more reservoirs, one or more substances within the lower portion of the housing. This may be implemented as described and with reference to FIGS. 1-3. In an embodiment, the one or more substances may include a first substance comprising at least an essential oil and a second substance. Essential oil may include any essential oil as described above in more detail in reference to FIG. 1. Essential oil may include a mixture of one or more essential oils as described above in more detail in reference to FIG. 1. In an embodiment, second substance may include water. In yet another nonlimiting example, essential oil and second substance may be premixed. Premixed may include anything as described above in more detail in reference to FIG. 1. In an embodiment, one or more reservoirs may include a first reservoir comprising a first substance wherein the first substance includes at least an essential oil and a second reservoir containing a second substance. In an embodiment, first reservoir may be prefilled. Prefilled may include anything as described above in more detail in reference to FIG. 1. In another embodiment, the one or more reservoirs may include a first reservoir containing the first substance, a second reservoir containing the second substance, and a third reservoir configured to be empty when the flexible materials of the lower portion of the housing are in the decompressed state. In some cases, the one or more reservoirs may be configured to release the first substance and the second substance into the third reservoir as a function of the transition of the flexible materials of the lower portion of the housing from the decompressed state to the compressed state. In other cases, the one or more reservoirs may include an indicator configured to indicate a preferred fill level for the substance. In some instances Still referring to FIG. 3, at step 320, method 300 includes mixing, using one or more protruding components, the one or more substances within the one or more reservoirs, wherein the one or more protruding components are located inside the one or more reservoirs. This may be implemented as described and with reference to FIGS. 1-3. In an embodiment, the one or more protruding components may be configured to move in a flapping motion to mix the first substance and the second substance as a function the transition of the flexible materials of the lower portion of the housing from the decompressed state to the compressed state.

Still referring to FIG. 3, at step 325, method 300 includes fluidically connecting, using a flow port, the one or more reservoirs to an ejector. This may be implemented as described and with reference to FIGS. 1-3.

Still referring to FIG. 3, at step 330, method 300 includes ejecting, using the ejector, the one or more substances from the flow port, wherein the ejector is located on the upper portion of the housing. This may be implemented as described and with reference to FIGS. 1-3.

Figure 4:
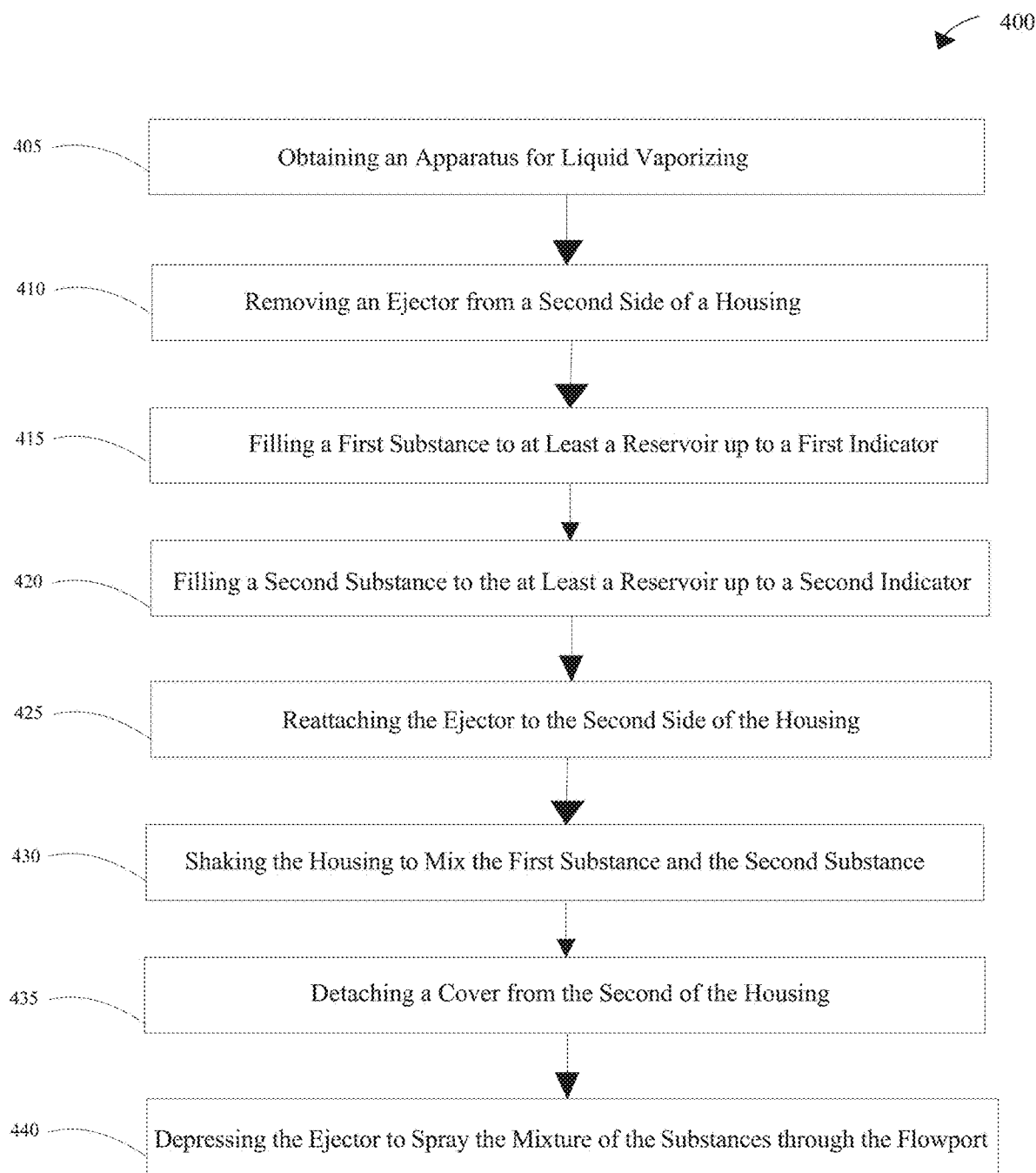
FIG. 4 is a flow diagram of an exemplary method of use for ejecting one or more substances.

Referring now to FIG. 4, a method 400 of using an apparatus for ejecting one or more substances is illustrated. In some embodiments, the apparatus may be consistent with an apparatus 100 disclosed with respect to FIG. 1. The method 400 is merely an exemplary method, wherein the apparatus may be used in various steps thereof. The ordering of steps is highly variable. The method 400 includes step 405 of obtaining the apparatus for ejecting one or more substances. The apparatus includes a housing, at least a reservoir, a flowport, an ejector, and a cover. The method 400 includes step 410 of removing the ejector from a second side of the housing. The method 400 includes step 415 of filling a first substance to the at least a reservoir up to a first indicator, wherein the first substance is essential oil. The method 400 includes step 420 of filling the second substance to the at least a reservoir up to a second indicator, wherein the second substance is water. The method 400 includes step 425 of reattaching the ejector to the second side of the housing. The method 400 includes step 430 of shaking the housing to mix the first substance and the second substance. In an embodiment, shaking the housing may be configured to make the protruding components move in a flapping motion to mix one or more substances. The method 400 includes step 435 of detaching the cover from the second side of the housing. The method 400 includes step 440 of depressing the ejector to spray the mixture of the substances through the flowport. This may be implemented as disclosed with reference to FIG. 1A-1B.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for ejecting one or more substances, wherein the apparatus comprises:
   a housing comprising an upper portion and a lower portion, wherein the lower portion of the housing is comprised of a flexible material;
   a cover configured to cover the upper portion of the housing;
   one or more reservoirs configured to store one or more substances within the lower portion of the housing, wherein the one or more reservoirs comprises:
      a first reservoir containing a first substance and wherein the first substance further comprises at least an essential oil; and
      a second reservoir containing a second substance;
   one or more protruding components configured to mix the one or more substances within the one or more reservoirs, wherein the one or more protruding components project from an interior surface of the one or more reservoirs;
   a flow port configured to fluidly connect the one or more reservoirs to an ejector; and
   the ejector configured to eject the one or more substances from the flow port, wherein the ejector is located on the upper portion of the housing.

2. The apparatus of claim 1, wherein the at least an essential oil further comprises Lavandula angustifolia oil.

3. The apparatus of claim 1, wherein the at least an essential oil further comprises Cananga odorata flower oil.

4. The apparatus of claim 1, wherein the at least an essential oil further comprises Hamamelis virginiana leaf extract.

5. The apparatus of claim 1, wherein the at least an essential oil further comprises Myroxylon pereirae oil.

6. The apparatus of claim 1, wherein the at least an essential oil further comprises Citrus aurantium bergamia fruit oil.

7. The apparatus of claim 1, wherein the at least an essential oil and the second substance are premixed.

8. The apparatus of claim 1, wherein the second substance further comprises at least an essential oil.

9. The apparatus of claim 1, wherein the one or more reservoirs is refillable.

10. The apparatus of claim 1, wherein the first reservoir is prefilled.

11. A method of manufacturing an apparatus for ejecting one or more substances, wherein the method comprises:
    obtaining a housing comprising an upper portion and a lower portion, wherein the lower portion of the housing is comprised of a flexible material;
    covering, using a cover, the upper portion of the housing;
    storing, using one or more reservoirs, one or more substances within the lower portion of the housing, wherein the one or more reservoirs comprises:
       a first reservoir containing a first substance and wherein the first substance further comprises at least an essential oil; and
       a second reservoir containing a second substance;
    mixing, using one or more protruding components, the one or more substances within the one or more reservoirs, wherein the one or more protruding components project from an interior surface of the one or more reservoirs;
    fluidly connecting, using a flow port, the one or more reservoirs to an ejector; and
    ejecting, using the ejector, the one or more substances from the flow port, wherein the ejector is located on the upper portion of the housing.

12. The method of claim 11, wherein the at least an essential oil further comprises Lavandula angustifolia oil.

13. The method of claim 11, wherein the at least an essential oil further comprises Cananga odorata flower oil.

14. The method of claim 11, wherein the at least an essential oil further comprises Hamamelis virginiana leaf extract.

15. The method of claim 11, wherein the at least an essential oil further comprises Myroxylon pereirae oil.

16. The method of claim 11, wherein the at least an essential oil further comprises Citrus aurantium bergamia fruit oil.

17. The method of claim 11, wherein the at least an essential oil and the second substance are premixed.

18. The method of claim 11, wherein the second substance further comprises at least an essential oil.

19. The method of claim 11, wherein the one or more reservoirs is refillable.

20. The method of claim 11, wherein the first reservoir is prefilled.

\* \* \* \* \*